(12) United States Patent
Barkan et al.

(10) Patent No.: US 11,210,482 B2
(45) Date of Patent: Dec. 28, 2021

(54) BARCODE READER HAVING CALIBRATION OF SCANNER IMAGE BRIGHTNESS WITH MULTIPLE FOVS FROM A SINGLE SENSOR

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 118 days.

(21) Appl. No.: 16/685,865

(22) Filed: Nov. 15, 2019

(65) Prior Publication Data

US 2021/0150162 A1    May 20, 2021

(51) Int. Cl.
*G06K 7/10*    (2006.01)
*G06K 7/14*    (2006.01)

(52) U.S. Cl.
CPC ..... *G06K 7/10584* (2013.01); *G06K 7/10554* (2013.01); *G06K 7/1413* (2013.01)

(58) Field of Classification Search
CPC .......... G06K 9/00604; G06K 9/00671; G06K 9/00597; G06K 9/2081; G06K 7/10732; G06K 9/222; G06K 7/10722; G06K 7/10752; G06K 9/00617; G06K 9/00691; G06K 9/00704; G06K 9/2063; G06K 9/209; G06K 9/3258; G06K 7/10821; G06K 9/00288; G06K 9/00362; G06K 9/0061; G06K 9/00771; G06K 9/2018; G06K 7/10831; G06K 7/10881; G06K 7/14; G06K 9/4661; G06K 7/10851; G06K 9/00; G06K 9/00208; G06K 9/00355; G06K 2207/1012; G06K 7/10712; G06K 7/109; G06K 7/1413; G06K 7/1417; G06K 7/1426; G06K 7/1443; G06K 19/06028; G06K 2207/1018; G06K 7/10; G06K 7/10742;
(Continued)

(56) References Cited

U.S. PATENT DOCUMENTS

| | | | | |
|---|---|---|---|---|
| 2009/0321614 A1* | 12/2009 | Drzymala | .......... | G06K 7/10732 250/208.1 |
| 2013/0175341 A1* | 7/2013 | Kearney | .............. | G06K 7/1096 235/440 |
| 2013/0175343 A1* | 7/2013 | Good | ................. | G06K 7/10693 235/462.32 |

\* cited by examiner

*Primary Examiner* — Thien T Mai
(74) *Attorney, Agent, or Firm* — Yuri Astvatsaturov

(57) ABSTRACT

A barcode reader having calibration of scanner image brightness with multiple FOVs from a single sensor is disclosed herein. An example barcode reader includes an imaging system having a first and second FOV. A first illumination system is configured to illuminate the first FOV. The first illumination system has a first tolerance range and a first characteristic. A second illumination system is configured to illuminate the second FOV. The second illumination system has a second tolerance range and a second characteristic. The first characteristic is established to achieve a minimum desired brightness at a beginning portion of the first tolerance range and a maximum desired brightness at an end portion of the first tolerance range. The second characteristic is established to achieve a minimum desired brightness at a beginning portion of the second tolerance range and a maximum desired brightness at an end portion of the second tolerance range.

18 Claims, 8 Drawing Sheets

(58) Field of Classification Search
CPC ............ G06K 7/10811; G06K 7/1478; G06K 9/00664; G06K 9/00832; G06K 9/00845; G06K 9/6267; G06K 2009/0006; G06K 2009/00932; G06K 2207/1011; G06K 2207/1017; G06K 7/10574; G06K 7/10584; G06K 7/1439; G06K 9/00033; G06K 9/0004; G06K 9/00067; G06K 9/00201; G06K 9/00892; G06K 9/2036; G06K 9/4628; G06K 9/6202; G06K 9/6288

See application file for complete search history.

BARCODE READER HAVING CALIBRATION OF SCANNER IMAGE BRIGHTNESS WITH MULTIPLE FOVS FROM A SINGLE SENSOR

BACKGROUND OF THE INVENTION

Barcode readers with a single image sensor may have disparate image brightness requirements for a generally horizontal window and a generally upright window for a variety of reasons. For example, in some barcode readers, the optical path lengths to the generally horizontal window and the generally upright window of the barcode reader from the single image sensor differ. The distances from respective illumination systems to the generally horizontal window and the generally upright window may vary. Additionally, different types of glass may be used in each window. Further, ambient light may provide better illumination for the generally upright window than for the horizontal window. Since a sole image sensor is used, the disparate image brightness requirements cannot be met by adjusting the exposure of the image sensor as would be possible if more than one image sensor was in use.

SUMMARY

According to a first aspect, a barcode reader for capturing an image of at least one object appearing in a field of view (FOV) includes an imaging system, a first illumination system and a second illumination system. The imaging system has a first FOV and a second FOV. The first illumination system is configured to illuminate the first FOV. The first illumination system has a first tolerance range and a first characteristic. The second illumination system is configured to illuminate the second FOV. The second illumination system has a second tolerance range and a second characteristic. The first characteristic is established to achieve a minimum desired brightness at a beginning portion of the first tolerance range and a maximum desired brightness at an end portion of the first tolerance range. The second characteristic is established to achieve a minimum desired brightness at a beginning portion of the second tolerance range and a maximum desired brightness at an end portion of the second tolerance range.

According to a second aspect, a method is disclosed for preparing a barcode reader for capturing an image of at least one object appearing in a field of view (FOV) where the barcode reader has an imaging system having a first illumination system configured to illuminate a first FOV and a second illumination system configured to illuminate a second FOV. The method includes identifying a first tolerance range of the first illumination system and identifying a second tolerance range of the second illumination system. The method further includes establishing a first characteristic of the first illumination system to achieve a minimum desired brightness at a beginning portion of the first tolerance range and a maximum desired brightness at an end portion of the first tolerance range. The method additionally includes establishing a second characteristic of the second illumination system to achieve a minimum desired brightness at a beginning portion of the second tolerance range and a maximum desired brightness at an end portion of the second tolerance range.

In some forms, at least one of the first characteristic and the second characteristic may be at least one of a quantity of LED lights, a current value, and illumination pulse width.

In some forms, at least one of establishing the first characteristic and establishing the second characteristic may include at least one of identifying a number of LED lights and installing the number of LED lights in the first illumination system, setting a current value for first illumination system, and setting an illumination pulse width for the first illumination system. In some forms, the first characteristic may be different than the second characteristic.

In some forms, the first FOV and the second FOV may be associated with a single image sensor.

In some forms, the minimum desired brightness may be established to allow the barcode reader to capture an image of a barcode having approximately a 25% minimum reflection difference in a scan zone of the barcode reader. In other forms, the maximum desired brightness may be established to prevent sensor saturation of more than approximately 25% at a window of the barcode reader.

In some forms, the first characteristic and the second characteristic may be preset or established during manufacture of the barcode reader. In other forms, the first characteristic and the second characteristic may be adjustable or maybe established after manufacture of the barcode reader.

In some forms, the barcode reader may further include a controller. The controller programmed to automatically adjust the first characteristic and the second characteristic based on an illumination intensity seen on a set target. The method may further include programming the controller to automatically adjust the first characteristic and the second characteristic based on an illumination intensity seen on a set target.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
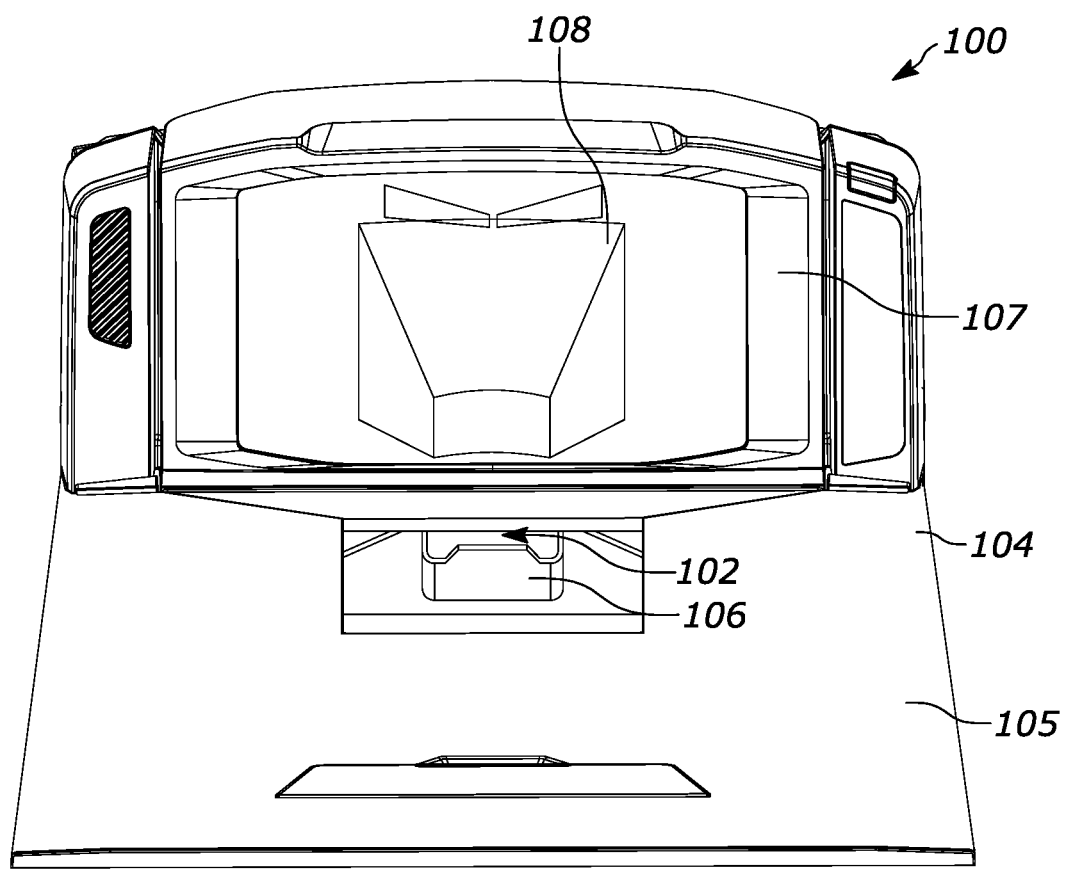
FIG. 1 is a front isometric view of a barcode reader of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, as shown in FIG. 1, a barcode reader 100 is shown. The barcode reader 100 may be a bioptic barcode reader. The barcode reader 100 is used to capture images of targets presented in a product-scanning region 102. The barcode reader 100 has a housing 104 having a lower housing portion 105 that supports a generally horizontal window 106 and an upper housing portion 107 that supports a generally upright window 108. For purposes of this specification, a generally horizontal window 106 may be positioned up to and including 45 degrees above or below a horizontal plane. For purposes of this specification, a generally upright window 108 may be positioned up to and including 45 degrees in front or behind a vertical plane. In the barcode reader 100 shown in FIG. 1, the generally horizontal window 106 is perpendicular to the generally vertical window 108. However, in other arrangements not herein depicted, the generally horizontal window 106 may be at an obtuse angle or an acute angle relative to the generally vertical window 108.

Figure 2:
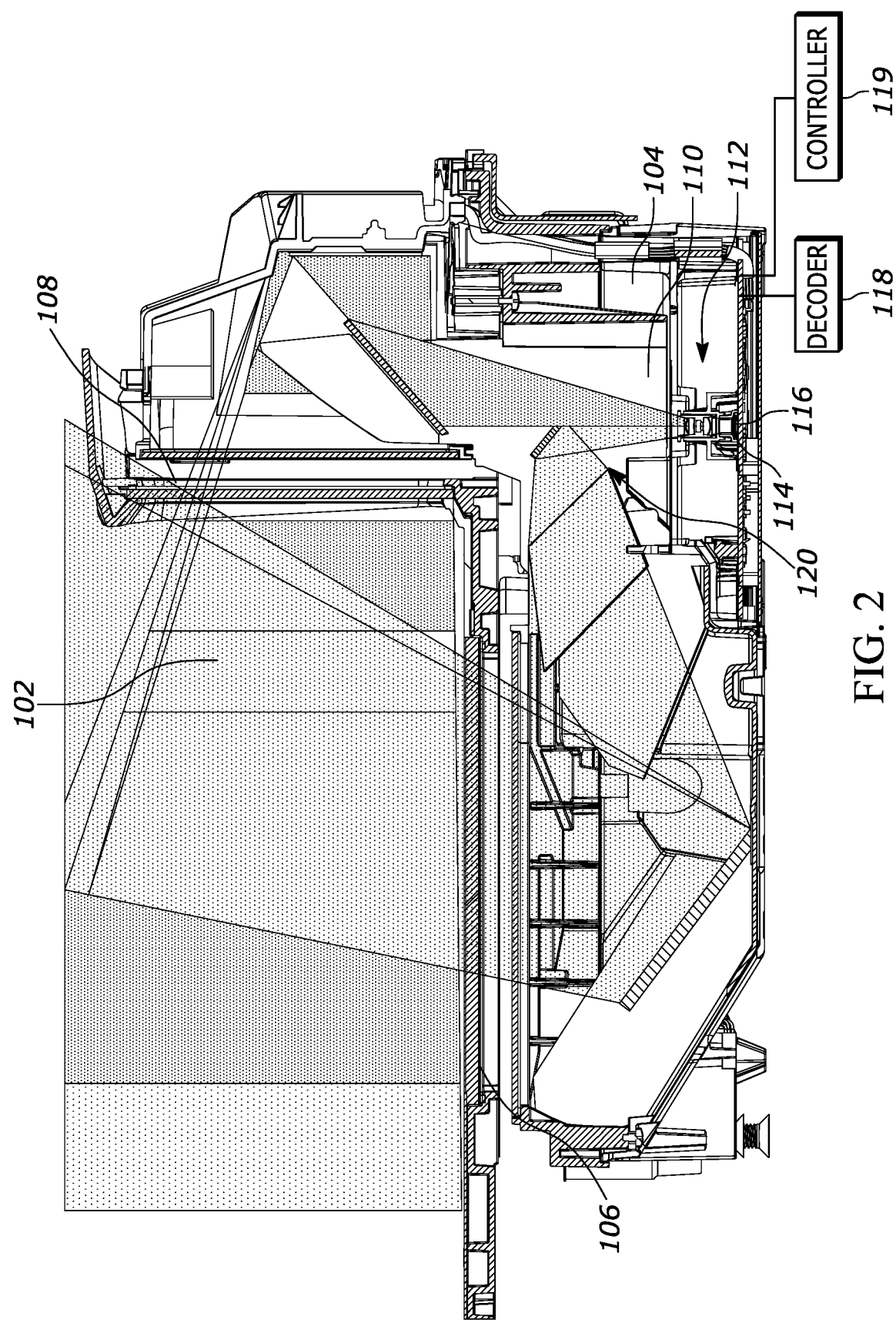
FIG. 2 is a side cross-sectional view of the barcode reader of FIG. 1.

As shown in FIG. 2, the housing 104 of the barcode reader 100 has an interior region 110. The generally horizontal window 106 is configured to allow a first light to pass between the product-scanning region 102 and the interior region 110 of the housing 104. The generally upright window 108 is configured to allow a second light to pass between the product-scanning region 102 and the interior region 110 of the housing 104. An imaging system 112 is provided in the interior region 108. The imaging system 112 includes a single image sensor 114. The image sensor 114 has a plurality of photosensitive elements forming a substantially flat surface 116. A decoder 118 (shown schematically) is communicatively coupled to the imaging system 112 and, specifically, the image sensor 114. The decoder 118 is configured to decode a barcode captured in an image by the image sensor 114. Only imaging system 112 is communicatively coupled to the decoder 118 and used to process images for decoding indicia. No other imaging system 112 in the barcode reader 100 does this. A controller 119 (discussed in greater detail below with respect to FIG. 7) is also communicatively coupled to the image sensor.

As also shown in FIG. 2, an optical assembly 120 is positioned within the interior region 110 of the housing 104. The image sensor 114 has a primary field of view (FOV) and is operable at a predetermined framerate. The predetermined framerate may, for example, be set at 60 frames per second. The optical assembly 120 is configured to divide the primary FOV into at least a first field of view (FOV) and a second field of view (FOV). In some arrangements, the optical assembly 120 then redirects the first FOV through the generally horizontal window 106 and redirects the second FOV through the generally upright window 108. The first FOV is configured to capture image data associated with a non-direct-part marking (DPM) barcode. The second FOV is also configured to capture image data associated with the DPM barcode.

The optical assembly 120 may divide the primary FOV into more than two fields of view. For example, as discussed below, the optical assembly may divide the primary FOV into subfield one, subfield two, subfield three, and subfield four. For purposes of this disclosure, the terms "first FOV" and "second FOV" may refer to single subfields or to a collection of more than one subfield. For example, "first FOV" may refer to subfield three and subfield four collectively, or "first FOV" may refer to subfield three or subfield four alone. Similarly, "second FOV" may refer to subfield one and subfield two collectively, or "second FOV" may refer to subfield one or subfield two alone. Other combinations of subfields, or identification of single subfields, also fall within the potential definitions of "first FOV" and "second field."

Figure 3:
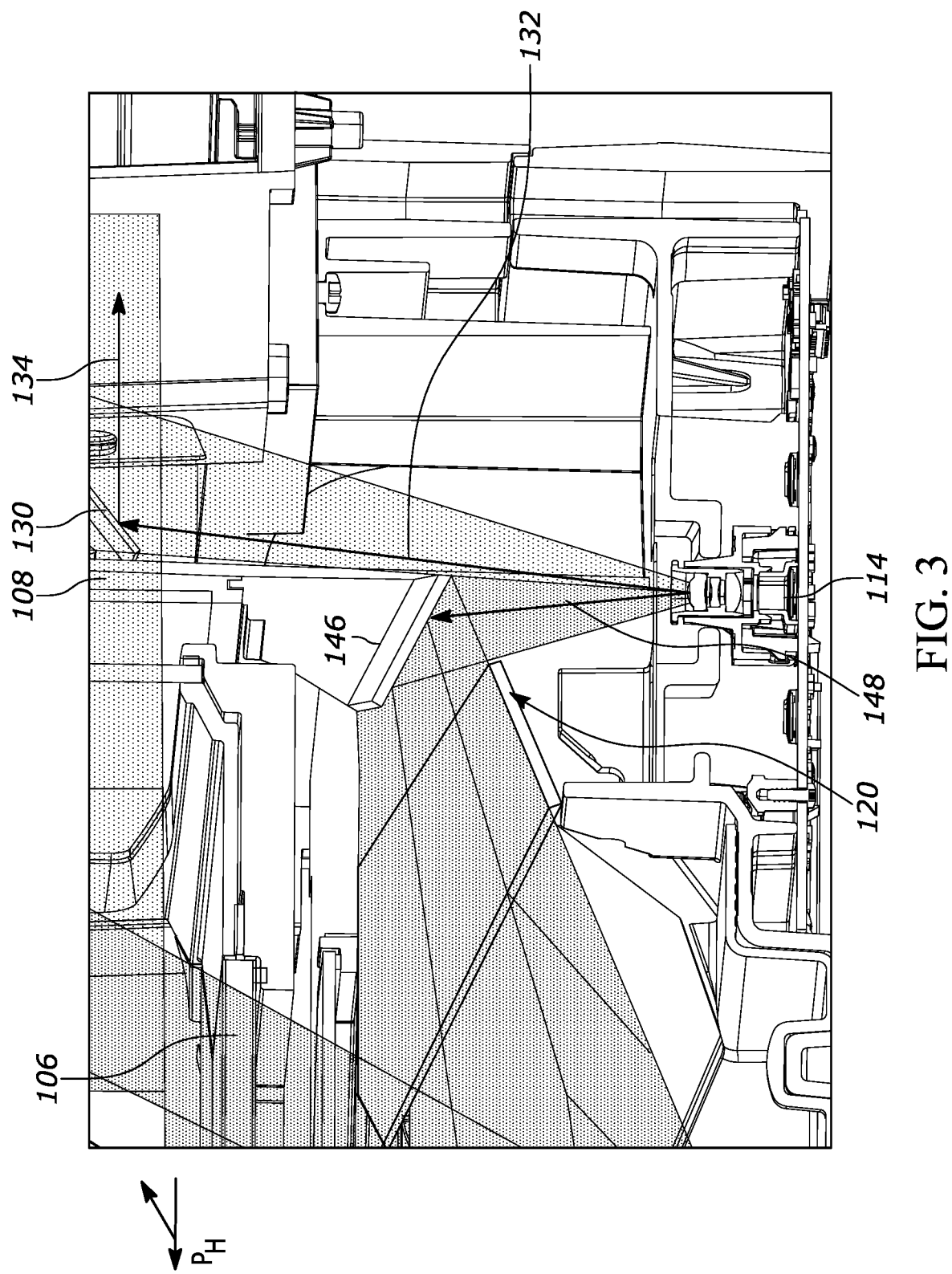
FIG. 3 is an enlarged side cross-sectional view of the barcode reader of FIGS. 1 and 2.
Figure 4:
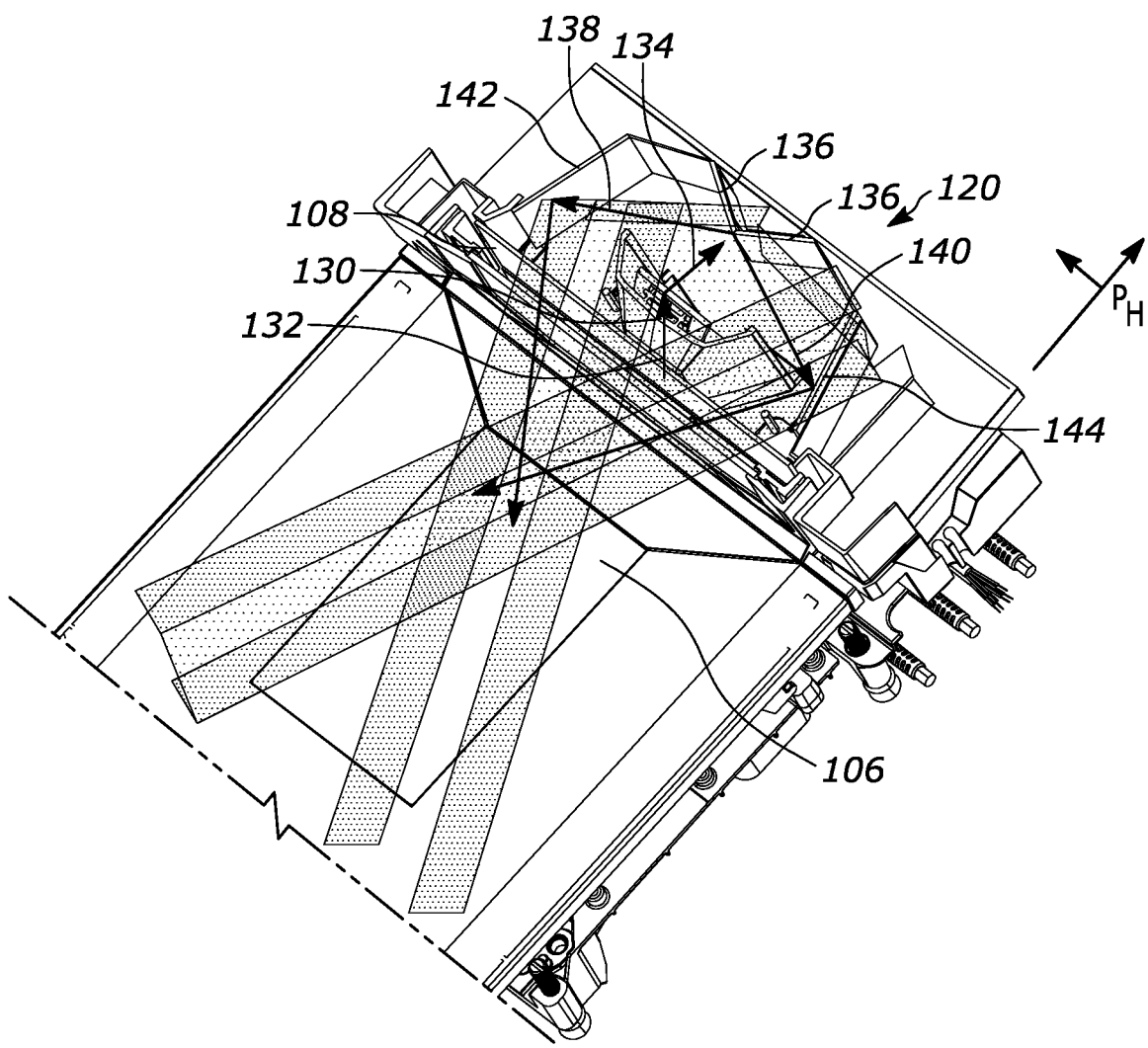
FIG. 4 is a top cutaway view of the imaging assembly pathways associated with a generally upright window of the barcode reader of FIGS. 1-3.

FIG. 3 and FIG. 4 together show the paths of the optical assembly 120 from the image sensor 114 to the generally upright window 108. As shown in FIGS. 3 and 4, the optical assembly 120 has a first fold mirror 130 positioned directly within a first path 132 of a first portion of the primary FOV. The first fold mirror 130 redirects the first portion of the primary FOV from the first path 132 to a second path 134. Referring now exclusively to FIG. 4, a first set of splitter mirrors 136 is positioned directly within the second path 134. More specifically, as shown, the first set of splitter mirrors 136 is located above a plane $P_H$ defined by the generally horizontal window 106 relative to the imaging assembly 112. The first set of splitter mirrors 136 splits the first portion of the primary FOV into subfield one and subfield two. Subfield one is directed by the first set of splitter mirrors 136 along a third path 138. Subfield two is directed by the first set of splitter mirrors 136 along a fourth path 140. A second fold mirror 142 is positioned directly within the third path 138 and redirects subfield one through the generally upright window 108. A third fold mirror 144 is positioned directly within the fourth path 140 and redirects subfield two through the generally upright window 108. As shown in FIG. 4, upon being redirected by the first set of splitter mirrors 136, subfield one and subfield two at least partially overlap.

Figure 5:
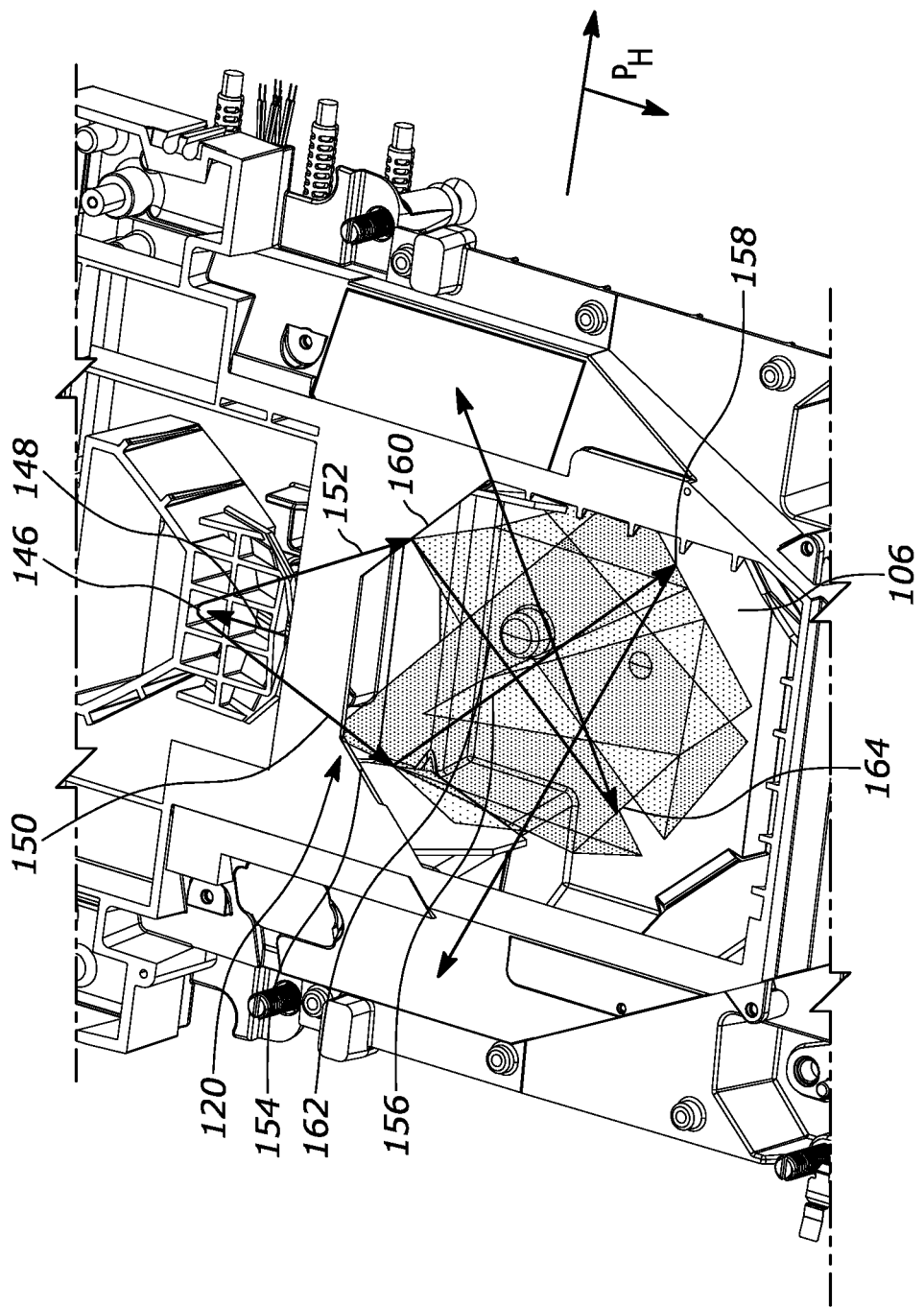
FIG. 5 is a top cutaway view of the imaging assembly pathways associated with the generally horizontal window of the barcode reader of FIGS. 1-4.
Figure 6:
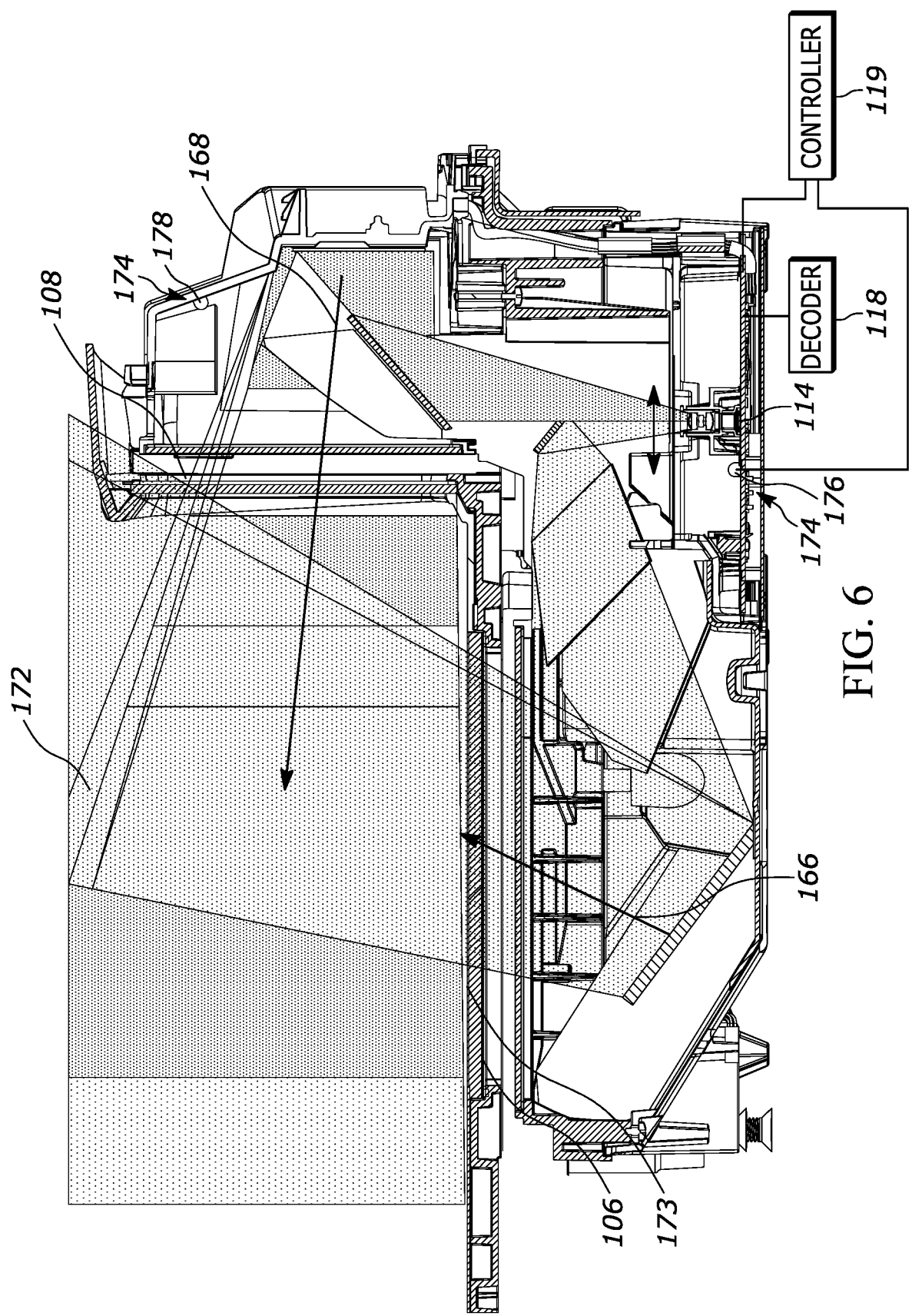
FIG. 6 is a side cross-sectional view of the barcode reader of FIGS. 1-5 illustrating optical lengths from the image sensor to the generally horizontal window and the generally upright window.

FIG. 3 and FIG. 5 together show the paths of the optical assembly 120 from the image sensor 114 to the generally horizontal window 106. As shown in FIGS. 4 and 6, a second set of splitter mirrors 146 is positioned directly within a fifth path 148 of a second portion of the primary FOV. The second set of splitter mirrors 146 is located below the plane $P_H$ defined by the generally horizontal window 106 relative to the imaging assembly 112. The second set of splitter mirrors 146 slits the second portion of the primary FOV into subfield three and a subfield four. Referring now exclusively to FIG. 6, the second set of splitter mirrors 146 redirects subfield three along a sixth path 150 and redirects subfield four along a seventh path 152. A fourth fold mirror 154 is positioned directly within the sixth path 150 and redirects subfield three along an eighth path 156. A fifth fold mirror 158 is positioned directly within the eighth path 156 and redirects subfield three through the generally horizontal window 106. A sixth fold mirror 160 is positioned directly within the seventh path 152 and redirects subfield four along a ninth path 162. A seventh fold mirror 164 is positioned directly within the ninth path 162 and redirects subfield four through the generally horizontal window 106. As shown in FIG. 5, upon being redirected by the second set of splitter mirrors 146, subfield three and subfield four at least partially overlap.

FIG. 6 shows the relative optical lengths from the image sensor 114 to the generally horizontal window 106 and the generally upright window 108. A first optical length 166 (partially depicted in FIG. 6) extends from the image sensor 114 to the generally horizontal widow 106. The first optical length 166 is measured along the primary FOV and either subfield three or subfield four, both of which pass through the generally horizontal window 106. Here, subfield three and/or subfield four constitute the first FOV. A second optical length 168 (partially depicted in FIG. 6) extends from the image sensor 114 to the generally upright window 108. The second optical length 168 is measured along the primary FOV and either subfield one or subfield two, both of which pass through the generally upright window 108. Here, subfield one and/or subfield two constitute the second FOV. The first optical length 166 is different than the second optical length 168. Specifically, the first optical length 166 is longer than the second optical length 168. The first optical length 166 and the second optical length 168 can be adjusted by moving the image sensor 114 forward or backward. This allows a vertical focus distance 172 and a horizontal focus distance 173 to be determined. For example, the horizontal focus distance 173 may be set at the generally horizontal window 106 and the window may be located above the generally horizontal window 106 approximately one-third of the way across the generally horizontal window 106 from the generally upright window 108.

To illuminate targets appearing within the first FOV and the second FOV, an illumination assembly 174 is provided. The illumination assembly 174 includes a first illumination system 176 and a second illumination system 178. The first illumination system 176 is configured to illuminate the targets appearing within the first FOV. The second illumination system 178 is configured to illuminate targets appearing within the second FOV. The first illumination system has a first tolerance range and a first characteristic, and the second illumination system has a second tolerance range and a second characteristic. The first characteristic is established to achieve a minimum desired brightness at a beginning portion of the first tolerance range and a maximum desired brightness at an end portion of the first tolerance range. The second characteristic is established to achieve a minimum desired brightness at a beginning portion of the second tolerance range and a maximum desired brightness at an end portion of the second tolerance range. A method 300 of preparing a barcode reader for capturing an image of at least one object appearing in a field of view using the first illumination system 176 and the second illumination system 178 is described in further detail with respect to FIG. 8.

Figure 7:
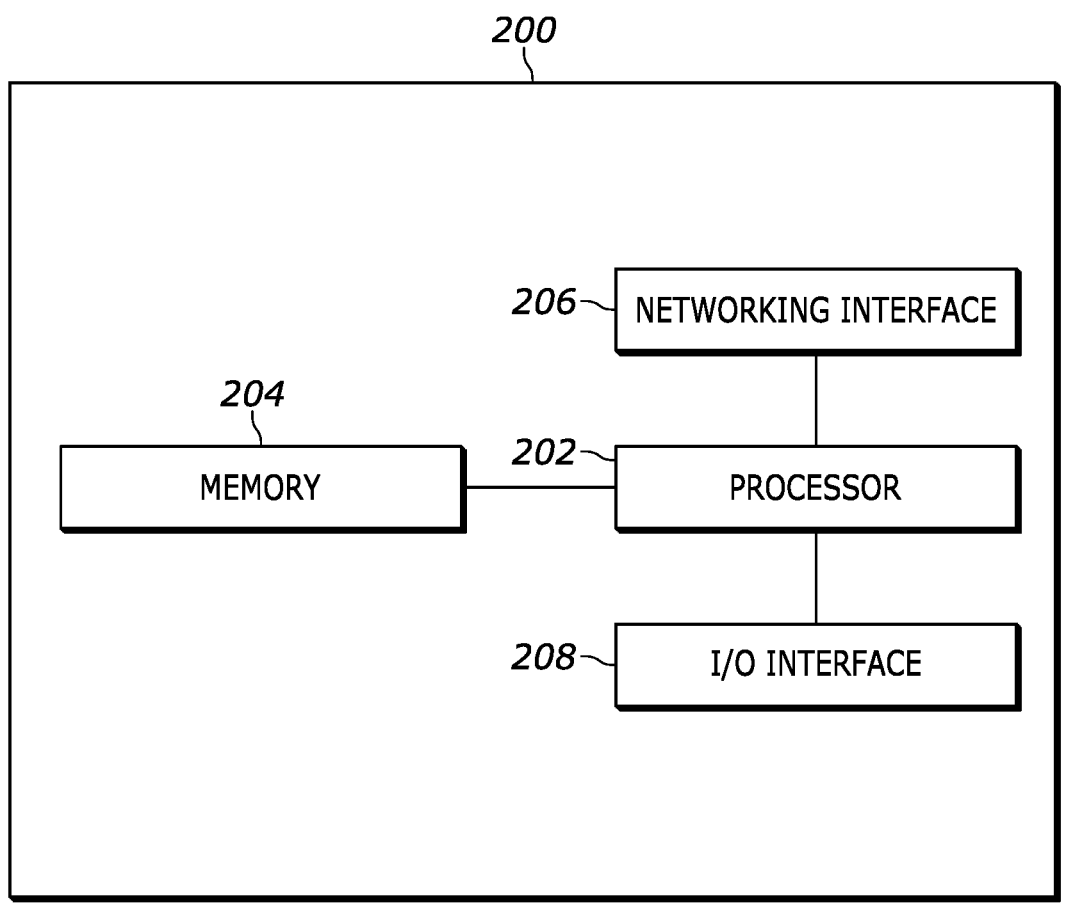
FIG. 7 is a schematic view of a controller of a barcode reader of the present disclosure.

FIG. 7 is a block diagram representative of an example logic circuit capable of implementing, for example, one or more steps of the example method 300 of FIG. 8, discussed below, or, more generally, the example controller 119 of FIG. 6. The example logic circuit of FIG. 7 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 7 includes a processor 202 such as, for example, one or more microprocessors, controllers, and/or any suitable type of processor. The example processing platform 200 of FIG. 7 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 7 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s). The example, processing platform 200 of FIG. 7 also includes input/output (I/O) interfaces 208 to enable receipt of user input and communication of output data to the user.

Figure 8:
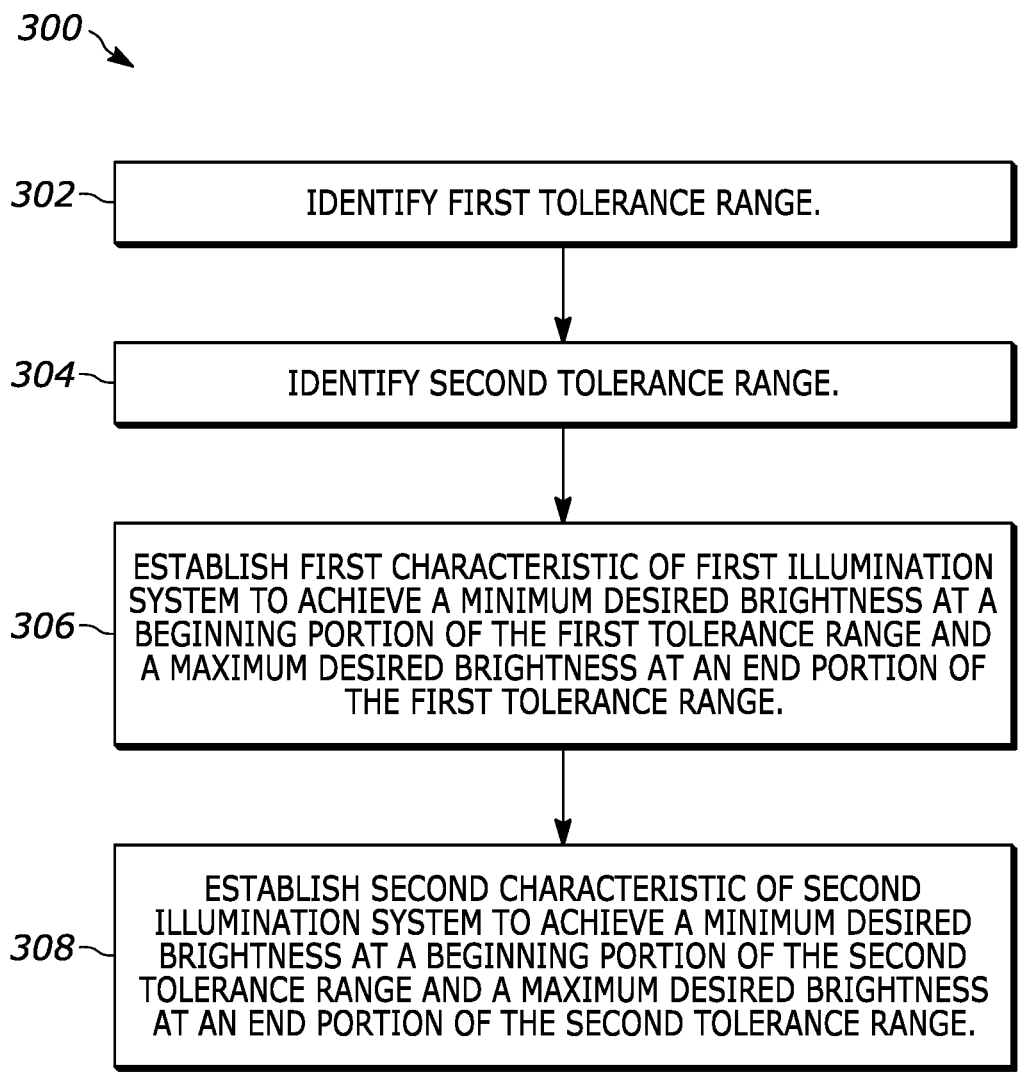
FIG. 8 illustrates a method of capturing an image of at least one object appearing in a FOV of the barcode reader of the present disclosure.

FIG. 8 illustrates a method 300 of preparing the barcode reader 100 for capturing an image of at least one object appearing in a field of view. At box 302, the method includes identifying a first tolerance range of the first illumination system 176. At box 304, the method includes identifying a second tolerance range of the second illumination system 178. At box 306, the method includes establishing a first characteristic of the first illumination system to achieve a minimum desired brightness at a beginning portion of the first tolerance range and a maximum desired brightness at an end portion of the first tolerance range. At box 308, the method includes establishing a second characteristic of the second illumination system to achieve a minimum desired brightness at a beginning portion of the second tolerance range and a maximum desired brightness at an end portion of the second tolerance range.

For example, the first characteristic and/or the second characteristic may be one of a quantity of LED lights, a current value, and an illumination pulse width. As such, establishing the first characteristic and establishing the second characteristic may include at least one of identifying a number of LED lights and installing the number of LED lights in the first illumination system, setting a current value for first illumination system, and setting an illumination pulse width for the first illumination system. The first characteristic may be different than the second characteristic. That is, for example, the minimum desired brightness and the maximum desired brightness may be achieved in the first illumination system 176 by installing a the number quantity of LED lights, while the minimum desired brightness and the maximum desired brightness may be achieved in the second illumination system 178 by setting the current value.

The first characteristic and/or the second characteristic may be preset or established during manufacture of the barcode reader 100. For example, the barcode reader 100 may initially have a set quantity of LED lights installed in the first illumination system 176 and/or the second illumination system 178. Alternately or in addition, the first characteristic and/or the second characteristic may be adjustable after manufacture of the barcode reader 100. For example, once the barcode reader 100 is in place and the ambient light conditions have been determined for the first FOV and the second FOV, the current value provided to the first illumination system 176 and/or the second illumination system 178 may be adjusted to account for the ambient light conditions.

The minimum desired brightness may be established to allow the barcode reader to capture an image of a barcode having approximately a 25% minimum reflection difference in a scan zone of the barcode reader. Other minimum reflection differences may be used as the minimum desired brightness. The maximum desired brightness is established to prevent sensor saturation of more than approximately 25% at a window of the barcode reader. Other sensor saturation amounts may be used as the maximum desired brightness.

The method may further include using the controller 119 of the barcode reader 100 to automatically adjust the first characteristic and/or the second characteristic based on an illumination intensity seen on a set target. A target is set for purposes of adjusting the first characteristic and/or the second characteristic. The target may be built into the barcode reader 100, such as being a portion of the housing 104 or another feature of the barcode reader 100 not described in depth herein, such as a weigh platter. Alternately, a fixed distance calibration target could be included with each barcode reader 100 for use by the customer, or the customer could initiate calibration and then place a white piece of paper directly against the generally horizontal window 106 or the generally upright window 108. As still another option, using a type of barcode with a fixed density, the distance to the barcode could be determined and the anticipated brightness or contrast extrapolated. If the brightness or contrast were not as expected based on the distance, the system could automatically adjust.

The barcode reader 100, which can implement method 300 above, is able to provide appropriate illumination for image capture and barcode decoding even when the optical path lengths to the generally horizontal window 106 and the generally upright window 108 are different. Likewise, the barcode reader 100 provides adequate illumination when the glass used in the generally horizontal window 106 and generally upright window 108 varies, or when the ambient light striking the generally horizontal window 106 differs from the ambient light striking the generally upright window 108. Addressing these issues facilitates the use of only one image sensor 114 in the barcode reader 100, as opposed to multiple image sensors, thereby reducing the cost and complexity of the barcode reader 100.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader for capturing an image of at least one object appearing in a field of view (FOV), the barcode reader comprising:
   an imaging system having a first FOV and a second FOV;
   a first illumination system configured to illuminate the first FOV, the first illumination system having a first tolerance range and a first characteristic;
   a second illumination system configured to illuminate the second FOV, the second illumination system having a second tolerance range and a second characteristic;
   wherein the first characteristic is established to achieve a minimum preset brightness at a beginning portion of the first tolerance range and a maximum preset brightness at an end portion of the first tolerance range; and
   wherein the second characteristic is established to achieve a minimum preset brightness at a beginning portion of the second tolerance range and a maximum preset brightness at an end portion of the second tolerance range.

2. The barcode reader of claim 1, wherein at least one of the first characteristic and the second characteristic is at least one of a quantity of LED lights, a current value, and illumination pulse width.

3. The barcode reader of claim 1, wherein the first FOV and the second FOV are associated with a single image sensor.

4. The barcode reader of claim 1, wherein the first characteristic is different than the second characteristic.

5. The barcode reader of claim 1, wherein the minimum preset brightness is established to allow the barcode reader to capture an image of a barcode having approximately a 25% minimum reflection difference in a scan zone of the barcode reader.

6. The barcode reader of claim 1, wherein the maximum preset brightness is established to prevent sensor saturation of more than approximately 25% at a window of the barcode reader.

7. The barcode reader of claim 1, wherein the first characteristic and the second characteristic are preset during manufacture of the barcode reader.

8. The barcode reader of claim 1, wherein the first characteristic and the second characteristic are adjustable after manufacture of the barcode reader.

9. The barcode reader of claim 1, wherein the barcode reader further comprises a controller, the controller programmed to automatically adjust the first characteristic and the second characteristic based on an illumination intensity seen on a set target.

10. A method of preparing a barcode reader for capturing an image of at least one object appearing in a field of view (FOV), the barcode reader having an imaging system having a first illumination system configured to illuminate a first FOV and a second illumination system configured to illuminate a second FOV, the method comprising:
   identifying a first tolerance range of the first illumination system;
   identifying a second tolerance range of the second illumination system;
   establishing a first characteristic of the first illumination system to achieve a minimum preset brightness at a beginning portion of the first tolerance range and a maximum preset brightness at an end portion of the first tolerance range; and
   establishing a second characteristic of the second illumination system to achieve a minimum preset brightness at a beginning portion of the second tolerance range and a maximum preset brightness at an end portion of the second tolerance range.

11. The method of claim 10, wherein at least one of establishing the first characteristic and establishing the second characteristic includes at least one of identifying a number of LED lights and installing the number of LED lights in the first illumination system, setting a current value for first illumination system, and setting an illumination pulse width for the first illumination system.

12. The method of claim 10, wherein the first FOV and the second FOV are associated with a single image sensor.

13. The method of claim 10, wherein the first characteristic is different than the second characteristic.

14. The method of claim 10, wherein the minimum preset brightness is established to allow the barcode reader to capture an image of a barcode having approximately a 25% minimum reflection difference in a scan zone.

15. The method of claim 10, wherein the maximum preset brightness is established to prevent sensor saturation of more than approximately 25% at a window of the barcode reader.

16. The method of claim 10, wherein the first characteristic of the first illumination system and the second characteristic of the second illumination system are established during manufacture of the barcode reader.

17. The method of claim 10, wherein both the first characteristic of the first illumination system and the second characteristic of the second illumination system are established after manufacture of the barcode reader.

18. The method of claim 10, wherein the barcode reader further comprises a controller, and the method further includes programming the controller to automatically adjust the first characteristic and the second characteristic based on an illumination intensity seen on a set target.

\* \* \* \* \*